(12) United States Patent
Czompo

(10) Patent No.: US 8,750,897 B2
(45) Date of Patent: Jun. 10, 2014

(54) METHODS AND APPARATUSES FOR USE IN DETERMINING A MOTION STATE OF A MOBILE DEVICE

(75) Inventor: Joseph Czompo, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 13/277,123

(22) Filed: Oct. 19, 2011

(65) Prior Publication Data

US 2013/0102323 A1    Apr. 25, 2013

(51) Int. Cl.
*H04W 4/26* (2009.01)
*G01S 19/34* (2010.01)

(52) U.S. Cl.
CPC ..................... *G01S 19/34* (2013.01)
USPC ..................... 455/456.1; 455/404.2

(58) Field of Classification Search
USPC ............ 455/456.1, 404.2, 67.11; 342/357.22, 342/357.39; 701/141, 179, 200
See application file for complete search history.

(56) References Cited

U.S. PATENT DOCUMENTS

| | | | |
|---|---|---|---|
| 5,610,815 A | 3/1997 | Gudat et al. | |
| 6,721,657 B2 | 4/2004 | Ford et al. | |
| 7,646,336 B2 | 1/2010 | Tan et al. | |
| 2006/0208169 A1* | 9/2006 | Breed et al. | 250/221 |
| 2007/0057779 A1 | 3/2007 | Battista et al. | |
| 2007/0239321 A1 | 10/2007 | McAden | |
| 2009/0189788 A1 | 7/2009 | Faus et al. | |
| 2009/0289845 A1 | 11/2009 | Gum | |
| 2010/0121214 A1* | 5/2010 | Giftakis et al. | 600/544 |
| 2011/0054833 A1* | 3/2011 | Mucignat | 702/150 |
| 2011/0071759 A1 | 3/2011 | Pande et al. | |
| 2011/0106418 A1* | 5/2011 | van der Merwe | 701/200 |
| 2011/0172912 A1 | 7/2011 | Fukuta et al. | |
| 2012/0265716 A1* | 10/2012 | Hunzinger et al. | 706/12 |
| 2013/0046505 A1* | 2/2013 | Brunner et al. | 702/141 |

OTHER PUBLICATIONS

Fujimoto, K., et. al. (Aug. 30, 2011). Research into the Application of Integrated RTK-GPS/INS Systems from IT Construction. Institute of Navigation National Technical Meeting, NTM 2007. 436-445.
Raskovic, D. & Giessel, D. (2007). Battery-Award Embedded GPS Receiver Node. IEEE, Fourth Annual—International Conference on Mobile and Ubiquitous System: Networking & Services, MobiQultous 2007, 1-6.
International Search Report and Written Opinion—PCT/US2012/056943—ISA/EPO—Jan. 3, 2013.

* cited by examiner

*Primary Examiner* — Cong Tran
(74) *Attorney, Agent, or Firm* — Berkeley Law & Technology Group, LLP

(57) ABSTRACT

Techniques are provided which may be implemented using various methods and/or apparatuses in a mobile device to classify and/or otherwise determine a "motion state" of the mobile device. The mobile device may, for example, classify a motion state of the mobile device based on sensed data (e.g., from inertial sensors, environmental sensors, etc.) that may be filtered based on a vibration profile. A motion state may then affect operation of one or more other functions performed or supported by the mobile device.

36 Claims, 4 Drawing Sheets

METHODS AND APPARATUSES FOR USE IN DETERMINING A MOTION STATE OF A MOBILE DEVICE

BACKGROUND

1. Field

The subject matter disclosed herein relates to electronic devices, and more particularly to methods, apparatuses, and/or articles of manufacture for use in determining and/or otherwise classifying a motion state of a mobile electronic device.

2. Information

Mobile electronic devices, such as, mobile phones, "Smart Phones", laptop computers, etc., may include positioning capabilities that allow for a relative location to be estimated, for example, as part of a navigation function. Additionally, certain mobile devices may include various sensors, such as, inertial sensors, that allow for inertial navigation, orientation, and/or certain user input related functions. For example, accelerometers and/or gyroscope sensors may be provided to measure or otherwise identify movement in linear and/or rotational directions.

Such sensors may be particularly sensitive and detect even the slightest movements of a mobile device. Such sensitivity may be of particular usefulness when for orientation and/or user input related functions.

There may be some functions in a mobile device that operate in a certain manner depending on whether the mobile device is considered to be moving or stationary. For example, a navigation function that uses received satellite positioning system (SPS) signals may operate in different modes based on whether the mobile is considered to be stationary or moving. In other examples, one or more functions, circuits, etc., may be enabled or disabled depending on whether a mobile device is considered to be stationary or moving.

With an increasing number of sensors, many of which may be highly sensitive, mobile devices may be able to determine with great accuracy when the mobile device is very stationary, e.g., when left sitting on a stable table. However, many devices may unnecessarily detect that a mobile device is "moving" when in fact it may be considered "stationary" (e.g., sitting in a jacket pocket of a person standing "still" in a line at a theater entrance). Hence, the slight movements of the person may falsely trigger changes in a motion state which may affect other functions.

SUMMARY

In accordance with an example aspect, a method for use in classifying a motion state of a mobile device may comprise: at a mobile device: filtering sensed data associated with one or more sensors at said mobile device based, at least in part, on a vibration profile associated with at least one mechanism capable of inducing movement of at least said mobile device; and classifying a motion state of said mobile device based, at least in part, on said filtered sensed data.

In accordance with another example aspect, an apparatus for use in classifying a motion state of a mobile device may comprise: memory; and at least one processing unit to: obtain sensed data from said memory, said sensed data being associated with one or more sensors at a mobile device; filter said sensed data based, at least in part, on a vibration profile associated with at least one mechanism capable of inducing movement of at least said mobile device; and determine a motion state of said mobile device based, at least in part, on said filtered sensed data.

In accordance with yet another example aspect, an apparatus for use in classifying a motion state of a mobile device may comprise: means for filtering sensed data associated with one or more sensors at a mobile device based, at least in part, on a vibration profile associated with at least one mechanism capable of inducing movement of at least said mobile device; and means for classifying a motion state of said mobile device based, at least in part, on said filtered sensed data.

In accordance with still another example aspect, an article of manufacture may comprise: a non-transitory computer readable medium having stored therein computer-implementable instructions executable by one or more processing units of a mobile device to: obtain sensed data associated with one or more sensors at said mobile device; filter said sensed data based, at least in part, on a vibration profile associated with at least one mechanism capable of inducing movement of at least said mobile device; and determine a motion state of said mobile device based, at least in part, on said filtered sensed data.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
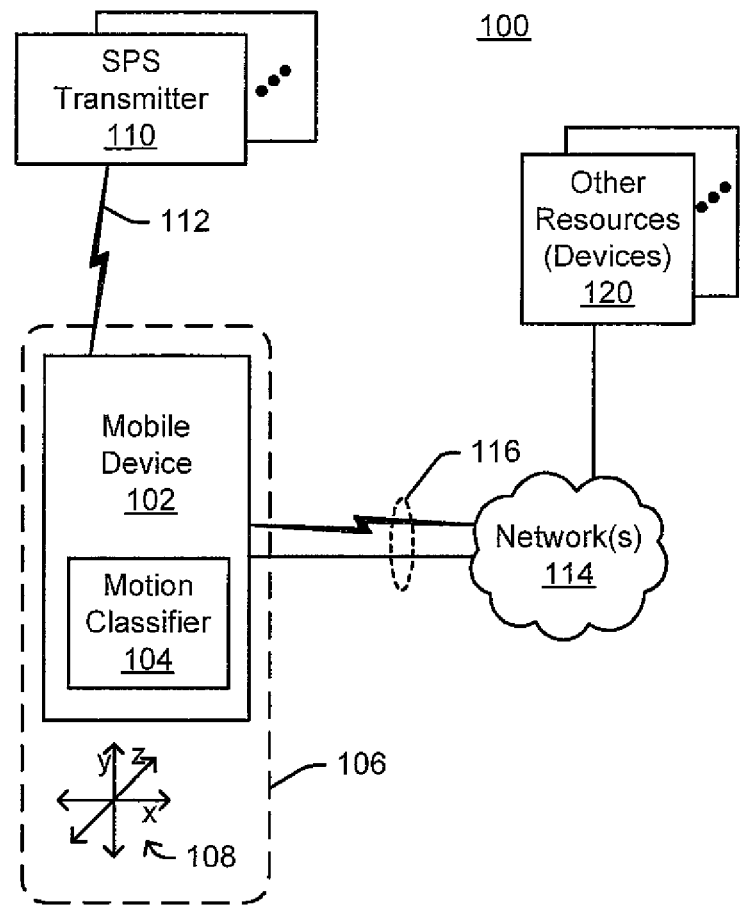
FIG. 1 is a schematic block diagram illustrating an example environment that includes a mobile device capable of determining and/or otherwise classifying its motion state based, at least in part, on filtered sensed data associated with the mobile device, in accordance with an implementation.

In accordance with certain aspects, example techniques are provided which may be implemented using various methods and/or apparatuses in a mobile device to classify and/or otherwise determine a "motion state" of the mobile device.

In accordance with certain example implementations, a method may be implemented in a mobile device for use in classifying a motion state of the mobile device based on sensed data (e.g., from inertial sensors, environmental sensors, etc.). By way of example, a motion state may comprise either a "stationary" state or at least type of "non-stationary" state. Some examples of such states are described in greater detail in later sections.

In an example implementation, a method may comprise obtaining sensed data that is associated with one or more sensors (e.g., inertial sensors, environmental sensors, etc.) at the mobile device. The sensed data may then be selectively filtered and/or otherwise processed in some manner to remove and/or reduce the presence of (or otherwise affect in some manner) at least a portion of the sensed data. Thus, for example, a filtering process/stage may be implemented to reduce or eliminate some or all of the sensed data corresponding to sensed "vibrations" which may be secondary or irrelevant in comparison, to other sensed linear motion and/or rotational motion forces. A filtering process/stage may be based, at least in part, on one or more vibration profiles associated with one or more mechanisms that are capable of inducing movement of a mobile device.

For example, a vibration profile may be provided for use with a machine (e.g., an automobile, a train, a plane, a boat, an elevator, etc.) that may support and at times move not only a mobile device but possibly also a user of the mobile device. Here, for example, a vibration profile may indicate certain filtering parameters associated with certain vibration or other like minor forces that may be produced by such a machine but which may not be specifically indicative of an induced movement of the mobile device in a substantial linear and/or rotational direction. For example, a mobile device may be substantially stationary in an automobile that is parked with its engine running. However, sensitive inertial sensors may still generate sensed data indicative of such "vibrations".

In another example, while a user of a mobile device may remain substantially still while standing in line at theater, the inertia data generated by inertial sensors may indicate certain vibrations associated with the user's slight movements (e.g., relating to maintaining balance, talking, breathing, gesturing, etc.). Hence, in certain example implementations, a vibration profile may indicate certain filtering parameters associated with certain vibration or other like minor forces that may be produced by a mobile device user, but which may not be specifically indicative of an induced movement of the mobile device in a substantial linear and/or rotational direction.

With this introduction, it should be recognized that in certain example implementations, a filtering process/stage may be based on one or more vibration profiles. For example, a filtering process/stage may be based on a compact automobile vibration profile and a seated user vibration profile. For example, a filtering process/stage may be based on a particular ferry-boat vibration profile and a standing male-user vibration profile. Of course, it should be kept in mind that while some example vibration profiles are described in the examples herein, claimed subject matter is not limited to such examples.

A "vibration profile" may comprise information and/or computer-implementable instructions that are, at least in part, associated with certain filtering parameters, values, and/or processes, which may be used to process sensed data to produce corresponding filtered sensed data. Such filtered sensed data may be less indicative of vibrations or other like minor forces that may be produced by a machine and/or a mobile device user, for example, but which may not be specifically indicative of an induced movement of the mobile device in a substantial linear and/or rotational direction.

As described in greater detail herein, a method may further comprise classifying a motion state of a mobile device based, at least in part, on the filtered sensed data. In certain example implementations, such a classifying process may comprise determining a variance value associated with at least a portion of the filtered sensed data over a period of time, and comparing the variance value with at least one threshold value. Here, for example, a variance value may represent an average variance value and/or a maximum variance value for a portion of the filtered sensed data during a period of time. In certain instances, a period of time may be associated with a particular vibration profile. For example, a period of time may be longer or shorter depending on the corresponding machine or user.

In still other example implementations, other available information may be considered when classifying a motion state. For example, a method may comprise classifying the motion state based, at least in part, on at least one satellite positioning system (SPS) signal obtained at the mobile device.

In certain further example implementations, it may be useful to selectively initiate a motion classification process and/or motion classifier. For example, it may be useful to save electrical power by selectively initiating a motion classification process and/or motion classifier in response to a motion detection event. For example, a motion detection event may be generated by an inertial sensor or other like capability in response to sensing one or more inertial forces. Thus, for example, an accelerometer may sense a linear force and/or a gyroscope may sense a rotational force and in response a motion detection event may be generated which may act to initiate a motion classification process. Hence, in certain example implementations, a method may comprise selectively obtaining sensed data in response to an initial motion detection event.

In certain example implementations, a method may further comprise affecting operation of at least one function performed, at least in part, by the mobile device based, at least in part, on the motion state. For example, a method may affect operation of a navigation function based on a stationary and/or non-stationary motion state. In another example, a method may affect operation of a power control function based on a stationary and/or a non-stationary motion state.

Attention is drawn now to FIG. 1 which is a schematic block diagram illustrating an example environment 100 that includes a mobile device 102 having a motion classifier 104 capable of determining and/or otherwise classifying its motion state based, at least in part, on filtered sensed data associated with mobile device 102.

Mobile device 102 is representative of any electronic device that may be reasonably moved about by a user and/or machine. By way of example but not limitation, mobile device 102 may comprise a computing and/or communication device such as a mobile telephone, a Smart Phone, a lap top computer, a tablet computer, a wearable computer, a personal digital assistant, a navigation device, a tracking device, etc.

In this illustration, a user or machine is represented by dashed-line box 106. Here, as illustrated by coordinate system reference 108, a user and/or machine may act in some manner, alone or in combination, to apply at least one physical force to mobile device 102 which may induce mobile device 102 to move in some manner. As described in the examples above, in certain instances such physical forces may result in movement of mobile device 102 in a substantial linear and/or rotational direction. Such movement (e.g., as indicated in filtered sensed data) may be considered by motion classifier 104, for example, to determine that mobile device 102 is in at least one type of non-stationary state. Conversely, a lack of such movement (e.g., in filtered sensed data) may be considered by motion classifier 104, for example, to determine that mobile device 102 is in a stationary state.

As previously mentioned, in certain instances some physical forces may result in limited and/or minor movements of mobile device 102, e.g., resulting in a "vibration" or the like. All or part of sensed data associated with such vibrations and/or the like minor movements may be selectively filtered and/or otherwise reduced or affected in some manner by motion classifier 104, for example, based on one or more vibration profiles.

Environment 100 may, in certain instances, also comprise a plurality of satellite positioning system (SPS) transmitters 110. For example, an SPS may comprise one or more Global Navigation Satellite Systems (GNSS), regional navigation systems, etc. As illustrated an SPS transmitter 110 may transmit an SPS signal 112 to mobile device 102. SPS transmitter may comprise a satellite and/or terrestrial transmitter. Mobile device 102 may, for example, perform and/or otherwise support various navigation functions (e.g., position estimation, velocity estimation, time estimation, tracking, routing, location based services, etc.).

As shown in FIG. 1, in certain instances, mobile device 102 may be capable of communicating with one or more other resources 120 (e.g., services, devices, etc.) via one or more networks 114 and/or communication links 116. Here, for example, resources 120 may comprise one or more servers or other like computing devices and network(s) 114 may comprise the Internet, etc.

In certain example implementations, mobile device 102 and/or resources 120 may be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

It should be recognized that communication link 116 shown in FIG. 1, may comprise one or more wireless communication links and/or one or more non-wireless communication links (e.g., with signals transmitted using one or more wires, fibers, etc.), and that such communication links 116 and/or network(s) 114 may also represent various supporting devices and/or technologies associated therewith.

Figure 2:
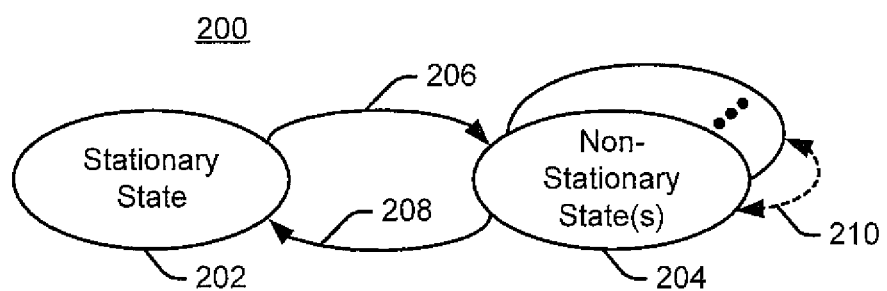
FIG. 2 is a state diagram illustrating certain example motion states as may be determined to exist by a mobile device, as in FIG. 1, in accordance with an implementation.

Attention is drawn next to FIG. 2, which shows a state diagram 200 illustrating certain example motion states as may be determined to exist by motion classifier 104 with regard to mobile device 102.

Motion classifier 104 (FIG. 1) may implement techniques as presented herein to determine based, at least in part, on filtered sensed data that mobile device 102 is in stationary state 202. For example, as described in greater detail herein, motion classifier 104 may process filtered sensed data to determine a variance value over a period of time, which may be compared to a threshold value as part of a determination of a motion state. Thus, for example, if a variance value does not exceed a threshold value then motion classifier 104 may determine that that mobile device 102 is in stationary state 202. Conversely, for example, if a variance value is equal to or exceeds a threshold value then motion classifier 104 may determine that that mobile device 102 is in a non-stationary state 204.

As illustrated by arrows 206 and 208, the motion state of mobile device 102 may transition between stationary state 202 and a non-stationary state 204.

Furthermore, as illustrated in FIG. 2, in certain example implementations, motion classifier 104 may be capable of classifying a motion state of mobile device 102 as being a particular type of non-stationary state 204. For example, motion classifier 104 may classify a motion state of mobile device 102 as being a non-stationary state 204 with respect to one, two, or three dimensions (e.g., as illustrated by coordinate system reference 108 in FIG. 1). In another example, motion classifier 104 may classify a motion state of mobile device 102 as being a non-stationary state 204 with respect to a roll, yaw or pitch rotation. For example, filtered sensed data may relate to one, two, three, or more specifically arranged accelerometers. For example, filtered sensed data may relate to selected gyroscope measurements.

In certain example implementations, a non-stationary state may also relate in some manner to one or more vibration profiles. For example, a vibration profile for an elevator may relate to linear motion limited to the up/down movement of the elevator and hence a non-stationary state may be indicative of such up/down movement(s).

As illustrated by dashed line arrow 210, in certain instances a motion state may transition from one non-stationary state 204 to another. Thus, for example, a one-dimensional non-stationary state may transition to a two or three dimensional non-stationary state, or vice-versa.

Figure 3:
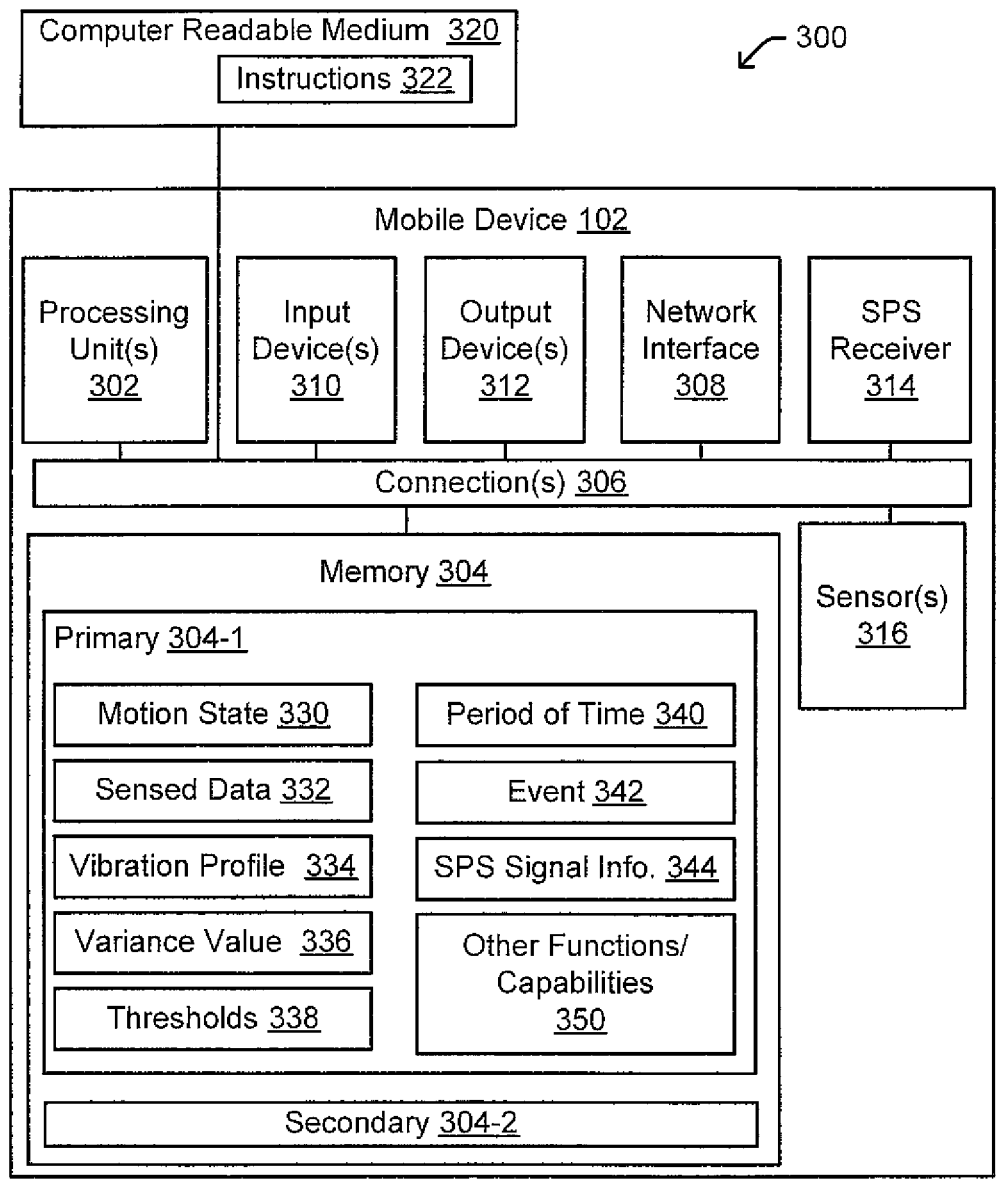
FIG. 3 is a schematic block diagram illustrating certain features of an example mobile device capable of determining and/or otherwise classifying its motion state based, at least in part, on filtered sensed data, in accordance with an implementation.

Reference is made next to FIG. 3, which is a schematic block diagram illustrating certain features of mobile device 102, for example as in FIG. 1, capable of determining and/or otherwise classifying its motion state based, at least in part, on filtered sensed data.

FIG. 3 shows a specific apparatus 300 in the form of a mobile device 102 which may act, at least in part, as a motion classifier 104 (FIG. 1). In this example, apparatus 300 comprises one or more sensors 316 capable of generating sensed data. Sensor(s) 316 may be representative of any inertial sensor(s) such as, for example, accelerometers, magnetometers, gravitometers, gyroscopes, barometers, etc., capable of sensing possible movement of mobile device 102.

As illustrated in this example, apparatus 300 may (optionally) communicate with other resource(s) 120 (FIG. 1) via network interface 308, and/or receive and process SPS signals 112 (FIG. 1) via SPS receiver 314.

As illustrated in FIG. 3, example mobile device 102 may comprise one or more processing units 302, memory 304, connections 306, network interface 308, one or more user input devices 310, one or more user output devices 312, SPS receiver 314, and one or more sensors 316.

As shown, memory 304 may comprise a primary memory 304-1, and/or a secondary memory 304-2. Here, for example, primary memory 304-1 is illustrated as storing information and/or instructions relating to a motion state 330, sensed data 332, a vibration profile 334, a variance value 336, one or more threshold values 338, a period of time 340, an initial motion detection event 342, SPS signal information 344, and/or other functions/capabilities 350, which may be accessed/provided or otherwise executed by processing unit(s) 302. Memory 304 may store instructions for motion classifier 104 that may be executed by processing unit(s) 302.

As illustrated, mobile device 102 may take the form of a specific computing device comprising one or more processing units 302 to perform data processing (e.g., in accordance with all or part of the techniques provided herein) coupled to memory 304 via one or more connections 306. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, primary memory 304-1 and/or secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a non-transitory computer readable medium 320. As illustrated, memory 304 and/or non-transitory computer readable medium 320 may comprise computer executable instructions 322 associated with data/signal processing (e.g., in accordance with the techniques provided herein).

In certain example implementations, as illustrated, mobile device 102 may further comprise one or more user input devices 310 (e.g., keyboard, touch screen, a microphone, a camera, etc.) and/or one or more user output devices 312 (e.g., a display, a projector, a speaker, etc.). Hence, for example, navigation function related information (e.g., location based service information, maps, etc.) may be presented to the user via some form of user output. Also, user input may be received which relates to a navigation function or other capabilities via the user input device(s) 310.

Although not illustrated, it should be understood that mobile device 102 may be enabled to perform a variety of tasks, some or many of which may be unrelated to location based services and/or other like position estimation capabilities.

Figure 4:
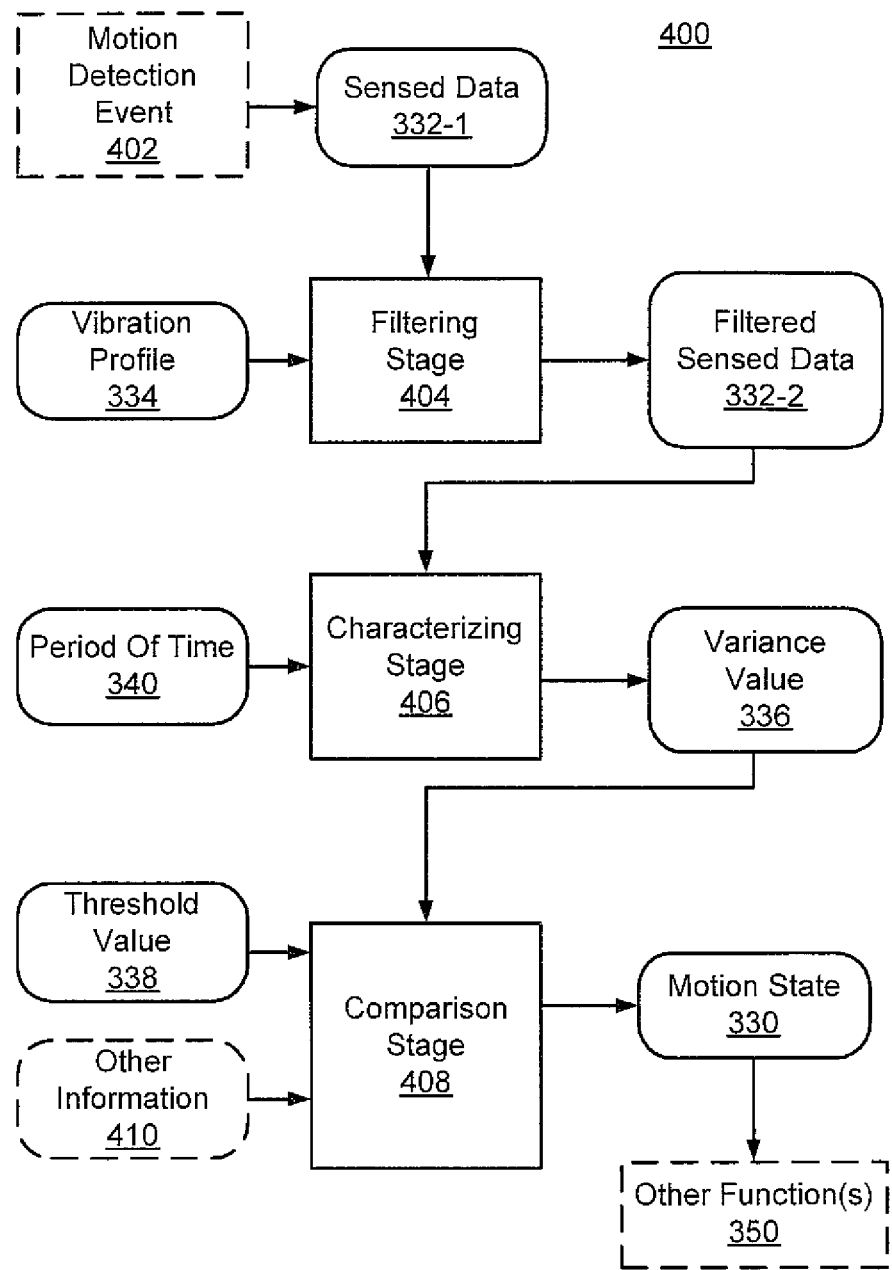
FIG. 4 is a schematic block diagram illustrating certain features of an example motion classifier for use in a mobile device to determine and/or otherwise classify a motion state based, at least in part, on filtered sensed data, in accordance with an implementation.

FIG. 4 is a schematic block diagram 400 illustrating certain features of an example motion classifier 104 for use in mobile device 102 to determine and/or otherwise classify a motion state based, at least in part, on filtered sensed data.

As shown, sensed data 332-1 may be generated by one or more sensors 316 (FIG. 3). In certain example implementations, a motion detection event 402 may occur which upon detection may initiate motion classifier 104. Thus, for example, sensed data 332-1 may be specifically obtained and/or updated in response to motion detection event 402.

Sensed data 332-1 may, for example, comprise specific and/or combined information associated one or more sensors 316. In certain instances, sensed data 332-1 may, for example, comprise information associated with one or more specific sensors and/or sensor related channels (e.g., x-axis channel, y-axis channel, z-axis channel, yaw channel, roll channel, pitch channel, etc.).

A filtering stage 404 may be provided to generate filtered sensed data 332-2 based, at least in part, on at least one vibration profile 334. Vibration profile 334 may, for example, be associated with one or more machine and/or user related (expected) vibrations which may be represented in sensed data 332-1. Filtering stage 404 may be enabled to filter out or otherwise reduce or affect the presence of sensed data possibly relating to such vibrations. Vibration profile 334 may, for example, be associated with one or more specific sensors and/or sensor related channels (e.g., x-axis channel, y-axis channel, z-axis channel, yaw channel, roll channel, pitch channel, etc.).

Vibration profile 334 may, for example, be based on empirical and/or simulated experiments. Vibration profile 334 may, for example, be associated with one or more specific machines, users, and/or related situations in which certain vibrations may occur. Vibration profile 334 may, for example, be based on specific capabilities of the sensors 316 available at the mobile device. Vibration profile 334 may, for example, be predetermined and/or dynamically determined, e.g., based on user input(s) and/or previous usage. Vibration profile 334 may, for example, be associated with one or more other particular functions/capabilities 350 (FIG. 3). Vibration profile 334 may, for example, be received from and/or provided to one or more other resources 120.

In certain instances, filtering stage 404 may process specific and/or combined information associated one or more sensors 316. Thus, in certain instances, filtering stage 404 may, for example, process information associated with one or more specific sensors and/or sensor related channels (e.g., x-axis channel, y-axis channel, z-axis channel, yaw channel, roll channel, pitch channel, etc.).

Consequently, filtered sensed data 332-2 may, for example, comprise specific and/or combined information associated one or more sensors 316. In other instances, filtered sensed data 332-2 may, for example, comprise information associated with one or more specific sensors and/or sensor related channels (e.g., x-axis channel, y-axis channel, z-axis channel, yaw channel, roll channel, pitch channel, etc.).

A characterizing stage 406 may be provided to determine a variance value 336 based, at least in part on filtered sensed data 332-2. Characterizing stage 406 may determine variance value 336 for a period of time 340, for example. By way of some non-limiting examples, variance value 336 may comprise and/or otherwise be associated with an average variance (e.g., of a magnitude) of filtered sensed data 332-2 during period of time 340, and/or a maximum variance (e.g., magnitude) of filtered sensed data 332-2 during period of time 340.

Those skilled in the art will recognize that variance value 336 may be based on and/or be associated with other mathematical and/or statistical calculations. Hence, in certain instances a "variance value" may not relate specifically to a variance but to some other value defined via mathematical, statistical and/or other like calculations.

In certain instances, characterizing stage 406 may process specific and/or combined information associated one or more sensors 316. Thus, in certain instances, characterizing stage 406 may, for example, process information associated with one or more specific sensors and/or sensor related channels (e.g., x-axis channel, y-axis channel, z-axis channel, yaw channel, roll channel, pitch channel, etc.). Consequently, variance value 336 may, for example, comprise specific and/or combined information associated one or more sensors 316.

A comparison stage 408 may be provided, for example, to determine and/or otherwise classify a motion state 330. For example, comparison stage 408 may determine motion state 330 based, at least in part, on variance value 336. Here, for example, comparison stage 408 may compare variance value 336 with a threshold value 338. In certain instances, comparison stage 408 may also consider other information 410. For example, other information 410 may relate to and/or comprise SPS signal information, navigation information (e.g., estimated position and/or velocity information), input device information (e.g., user inputs, microphone captured audio signals, camera captured visual signals, etc.), network signal information, and/or the like.

In certain instances, comparison stage 408 may process specific and/or combined information associated one or more sensors 316. Thus, in certain instances, comparison stage 408 may, for example, process information associated with one or more specific sensors and/or sensor related channels (e.g., x-axis channel, y-axis channel, z-axis channel, yaw channel, roll channel, pitch channel, etc.). Consequently, motion state 330 may, for example, relate to a specific type of non-stationary state 204.

As illustrated in FIG. 4, the resulting motion state 330 may affect operation of one or more other functions 350.

Figure 5:
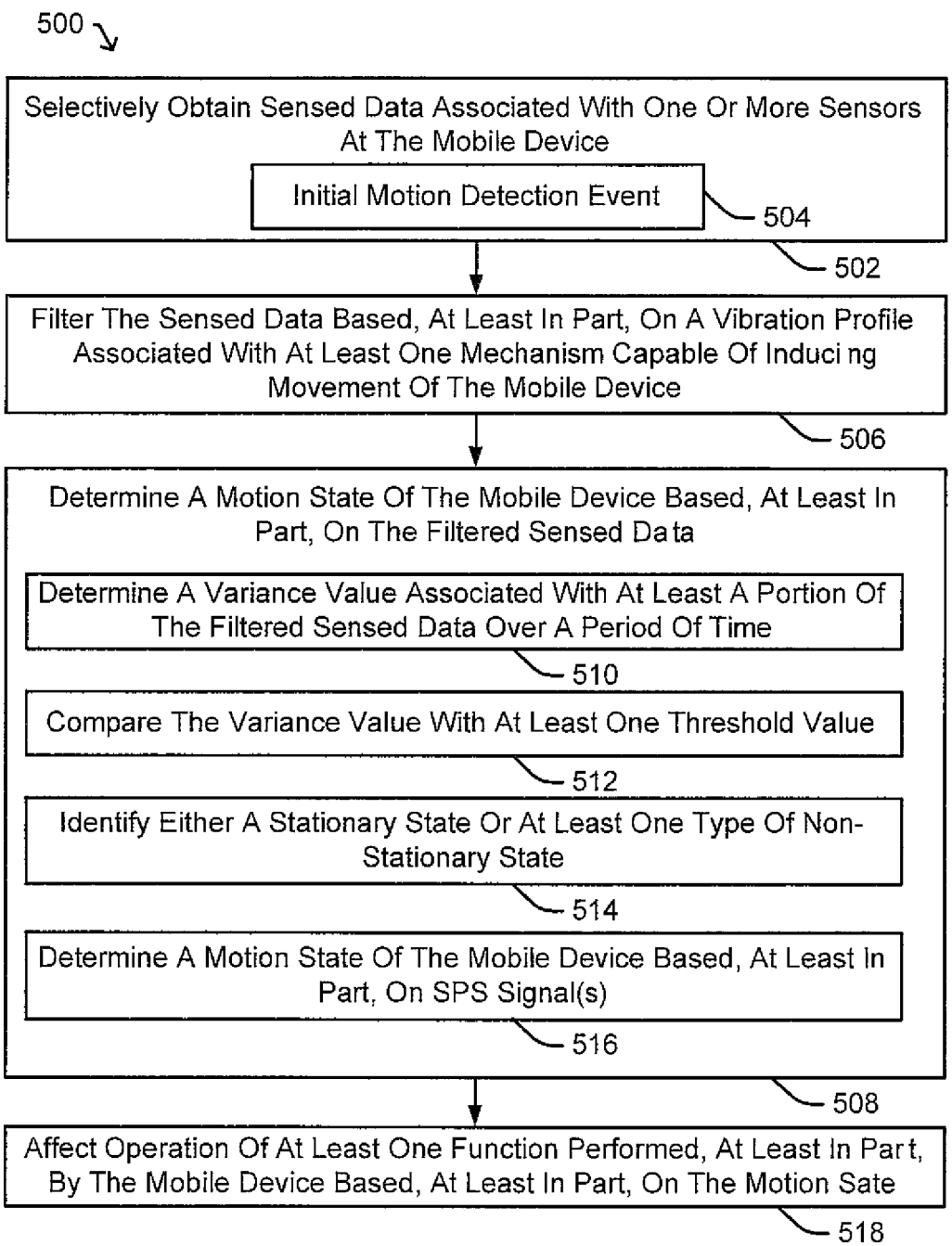
FIG. 5 is a flow diagram illustrating certain features of an example process for use in a mobile device to determine and/or otherwise classify a motion state based, at least in part, on filtered sensed data, in accordance with an implementation.

Reference is made now to FIG. 5, which is a flow diagram illustrating certain features of an example process 500 for use in mobile device 102 to determine and/or otherwise classify a motion state based, at least in part, on filtered sensed data.

At block 502, sensed data associated with one or more sensors at the mobile device may be selectively obtained. For example, at block 504, sensed data associated with one or more sensors at the mobile device may be selectively obtained or updated in response to an initial motion detection event.

At block 506, sensed data may be filtered based, at least in part, on a vibration profile associated with at least one mechanism (e.g., a user and/or machine) capable of inducing movement of the mobile device.

At block 508, a motion state of the mobile device may be determined based, at least in part, on filtered sensed data. Here, for example, at block 510, a variance value associated with at least a portion of filtered sensed data over a period of time may be determined. At block 512, for example, a variance value may be compared with at least one threshold value. At block 514, for example, either a stationary state or at least one type of non-stationary state may be identified. At block 516, for example, a motion state of the mobile device may be determined based, at least in part, on at least one SPS signal obtained at the mobile device, and/or other available information.

At block 518, operation of at least one function performed, at least in part, by the mobile device may be affected based, at least in part, on the motion state determined at block 508.

By way of example, at block 518, a motion state may be used to affect operation of a navigation function that uses SPS signals. Here, for example, a navigation function may receive SPS signals from a GNSS, e.g., the Global Positioning System (GPS), and obtain location estimates and/or navigation solutions based thereon. For example, a navigation function may process SPS signals to obtain pseudorange measurements to SPS transmitters 110 (FIG. 1), which are at known locations. As such, mobile device 102 may estimate its location using well known techniques.

In addition to location estimation, a navigation solution may include other information associated with mobile device 102, such as, for example, velocity, acceleration and predicted location, etc. Here, for example, a navigation function may implement a filter model, such as a Kalman filter, extended Kalman filter, and/or the like, for processing pseudorange measurements and/or pseudorange rate measurements.

In certain particular implementations, a particular filtering model, such as a Kalman filter, may apply different processing and/or rules in obtaining an estimated position/velocity/time based, at least in part, on motion state 330 (FIG. 3, FIG. 4). For example, if motion state 330 is a stationary state 202 (FIG. 2), then a "static" filtering model may be applied to the processing of pseudorange and/or pseudorange rate measurements. Conversely, if motion state 330 is a type of non-stationary state 204, then a "dynamic" filtering model may be applied instead.

In one particular implementation, a static filtering model may, for example, presume that the velocity of mobile device 102 is substantially zero while a dynamic filtering model may presume that there is some velocity. In another particular implementation, a static filtering model may apply less weight to pseudorange rate measurements than applied with a dynamic filtering model. It should be understood, however, that such static and dynamic filtering models are merely examples of different types of filtering models that may be applied to the processing of pseudorange/pseudorange measurements, and claimed subject matter is not limited in this respect.

In addition to application of different filtering models depending on motion state 330, other functions of mobile device 102 may be affected based on whether the mobile device is determined to be in a stationary state or a non-stationary state. For example, if it is determined that mobile device 102 has been in a stationary state since the most recent position fix, mobile device 102 may suspend attempting an update position fix (e.g., which may conserve battery life). In another example, a navigation function may tailor its carrier acquisition ranges (e.g., "Doppler windows") in some manner in response to motion state 330.

As previously mentioned, in certain example implementations, motion classifier 104 (FIG. 1) may consider available SPS related information while determining motion state 330. Here, for example, a navigation function may detect movement from a change in carrier phase of a received SPS signal, measured pseudorange rates and/or evaluation of a velocity component of a Kalman filter state. Such information may, for example, be provided as other information 410 to a comparison stage 408 (FIG. 4). In other example implementations, such information may be considered a motion detection event 402, which may initiate a motion classification process.

In certain other example implementations, filtered sensed data and/or variance values for different sensors or sensor channels, and possibly other information (e.g., SPS related information), may be jointly used in determining motion state 330. For example, motion classifier 104 may implement a voting scheme, a weighting scheme, and/or the like, which may all inertial sensors/channels, either individually or collectively, to affect the motion state decision in some preferred manner. Likewise, one or more aspects of a processed SPS signal may be used to cast one or more additional votes, etc., as to whether a mobile device may be in a stationary state or a non-stationary state. Thus, for example, based upon such votes cast (e.g., a majority rule), etc., motion classifier 104 may determine motion state 330.

By way of still additional non-limiting examples, some example implementations are provided below which illustrate certain features of a motion classifier 104, having filtering stage 404, characterizing stage 406 and comparison stage 408 (FIG. 4).

In this example, sensors 316 may comprise one or more accelerometers, gyroscopes, magnetometers, pressure sensors, etc. Data from such sensors may be stored directly to memory and/or processed in some manner before being stored to memory. For example, sensed data 332-1 may be obtained by filtering stage 404 from memory. Additionally, one or more vibration profiles 334 may also be stored in memory.

Filtering stage 404 may, for example, in response to a vibration profile 334 perform filtering of sensed data 332-1. In the example below, a low-pass filtering process is described by way of a non-limiting example. It should be recognized that other types of filtering processes and/or other processing techniques may be employed in other implementations. For example, a band-pass or high-pass filtering process may be employed. For example, a decimation, clipping, and/or other like process may be employed.

With this in mind, a non-limiting example low-pass filtering process may comprise filtering sensed data from three channels (e.g., from a three axis accelerometer) separately, using a Butterworth IIR filter. For example, consider the following notation:

$a_{x,i}$ = x-channel acceleration at epoch $i$ $a_{y,i}$ = y-channel acceleration at epoch $i$ $a_{z,i}$ = z-channel acceleration at epoch $i$ $b_{x,i}$ = filtered x-channel acceleration at epoch $i$ $b_{y,i}$ = filtered y-channel acceleration at epoch $i$ $b_{z,i}$ = filtered z-channel acceleration at epoch $i$ $$b_{x,i} = \sum_{j=o}^{p} B_j a_{x,i-j} - \sum_{j=1}^{p} A_j b_{x,i-j}$$

$$b_{y,i} = \sum_{j=o}^{p} B_j a_{y,i-j} - \sum_{j=1}^{p} A_j b_{y,i-j}$$

$$b_{z,i} = \sum_{j=o}^{p} B_j a_{z,i-j} - \sum_{j=1}^{p} A_j b_{z,i-j}$$

where p=4 is the filter order, $A_j$ and $B_j$ are filter coefficients. A filter corner frequency may be selected to be about 3 Hz, for example, which may be applicable to vibration profiles associated with various vehicles, pedestrians, and other moving platforms. With a selected 20 Hz sampling rate, the numerical values of the coefficients may be determined using known techniques. Here, for example, numerical values of the coefficients may be:

$A_1$=−1.570398851228172
$A_2$=1.275613324983280
$A_3$=−0.484403368335086
$A_4$=0.076197064610332
$B_0$=0.018563010626897
$B_1$=0.074252042507589
$B_2$=0.111378063761383
$B_3$=0.074252042507589
$B_4$=0.018563010626897

The sampling rate at which filtering stage 404 processes the sensed data samples may be adjusted or different in other implementations. In this example, a default value of 20 Hz is used. The Butterworth filter order p may be four. The low-pass filter corner frequency may be configurable as an internal parameter. Here, for example, a default is 3 Hz.

In characterizing stage 406, for example, at each sampling epoch i, the last n filtered sensed data samples may be used to compute a variance value for all three channels:

$$\sigma_{x,i}^2 = \frac{1}{n}\left[\sum_{j=i-n+1}^{i} b_{x,j}^2 - \frac{1}{n}\sum_{j=i-n+1}^{i} b_{x,j} \sum_{j=i-n+1}^{i} b_{x,j}\right]$$

$$\sigma_{y,i}^2 = \frac{1}{n}\left[\sum_{j=i-n+1}^{i} b_{y,j}^2 - \frac{1}{n}\sum_{j=i-n+1}^{i} b_{y,j} \sum_{j=i-n+1}^{i} b_{y,j}\right]$$

$$\sigma_{z,i}^2 = \frac{1}{n}\left[\sum_{j=i-n+1}^{i} b_{z,j}^2 - \frac{1}{n}\sum_{j=i-n+1}^{i} b_{z,j} \sum_{j=i-n+1}^{i} b_{z,j}\right]$$

and the overall variance may be computed as the sum of these:

$$\sigma_i^2 = \sigma_{x,i}^2 + \sigma_{y,i}^2 + \sigma_{z,i}^2$$

In this non-limiting example, a variance value 336 may be computed over a number of samples that corresponds to a processing window at the selected sampling rate. Here, in this example, a processing window has a default duration of one second.

At each reporting epoch, for example, a maximum value d of the last m variance values may be determined, where m is the number of data points in the period of time 340. This maximum value d may be considered the current value of a decision function.

In comparison stage 408, for example, when a decision function scaled by a scale factor $s^2$ is less than threshold $c^2$, a stationary state is detected, otherwise a non-stationary state is detected:

If $s^2 * d < c^2$ then motion state=a stationary state
Else motion state=a non-stationary state Thus, in this example, if a maximum variance computed over an m number of samples then scaled by a factor $s^2$, is smaller than a detection threshold $c^2$, comparison stage 408 determines a stationary state 202. A scale factor s, a period of time, and/or a threshold value may be programmable. One reason for introducing a scale factor s is to provide a higher resolution for a threshold, since a threshold may be implemented as an integer in certain instances.

In an example implementation, filtering stage 404, characterizing stage 406 and comparison stage 408 may employ various buffers during operation as described below.

An acceleration sample buffer may store acceleration samples and feed a low pass filter (LPF). The filtered values may be accumulated in a filtered acceleration buffer that feeds a characterizing stage. The computed variance values may accumulate in a variance buffer that feeds a comparison stage. A resulting maximum variance value, for example, may then be compared with a threshold value (e.g., possibly after scaling). The above example buffers may be reset, e.g., in response to a motion detection event.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "classifying", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use in classifying a motion state of a mobile device, the method comprising: at a mobile device:
    filtering sensed data from one or more sensors at said mobile device based, at least in part, on a vibration profile for at least one mechanism capable of inducing movement of at least said mobile device;
    determining a variance value corresponding to a change over a period of time for at least a portion of said filtered sensed data; and
    classifying a motion state of said mobile device based, at least in part, on a comparison of said variance value with at least one threshold value.

2. The method as recited in claim 1, wherein said variance value represents at least one of: an average variance value of said portion of said filtered sensed data during said period of time, or a maximum variance value of said portion of said filtered sensed data during said period of time.

3. The method as recited in claim 1, wherein said period of time corresponds to said vibration profile.

4. The method as recited in claim 1, further comprising:
    selectively obtaining said sensed data in response to an initial motion detection event.

5. The method as recited in claim 1, wherein said motion state comprises either a stationary state or at least one type of non-stationary state.

6. The method as recited in claim 1, wherein classifying said motion state further comprises:
    classifying said motion state based, at least in part, on at least one satellite positioning system (SPS) signal obtained at said mobile device.

7. The method as recited in claim 1, further comprising:
    affecting operation of at least one function performed, at least in part, by said mobile device based, at least in part, on said motion state.

8. The method as recited in claim 7, wherein said at least one function performed, at least in part, by said mobile device comprises at least one of a navigation function and/or a power control function.

9. The method as recited in claim 7, wherein said at least one mechanism comprises at least one of a mobile device user and/or a machine.

10. An apparatus for use in classifying a motion state of a mobile device, the apparatus comprising:
    memory; and
    at least one processing unit to:
        obtain sensed data from said memory, said sensed data corresponding to one or more sensors at a mobile device;
        filter said sensed data based, at least in part, on a vibration profile for at least one mechanism capable of inducing movement of at least said mobile device;
        determine a variance value corresponding to a change over a period of time for at least a portion of said filtered sensed data; and
        determine a motion state of said mobile device based, at least in part, on a comparison of said variance value with at least one threshold value.

11. The apparatus as recited in claim 10, wherein said variance value represents at least one of: an average variance value of said portion of said filtered sensed data during said period of time, or a maximum variance value of said portion of said filtered sensed data during said period of time.

12. The apparatus as recited in claim 10, wherein said period of time corresponds to said vibration profile.

13. The apparatus as recited in claim 10, said at least one processing unit to further: selectively obtain said sensed data in response to an initial motion detection event.

14. The apparatus as recited in claim 10, wherein said motion state comprises either a stationary state or at least one type of non-stationary state.

15. The apparatus as recited in claim 10, further comprising:
    a satellite positioning system (SPS) receiver; and
    wherein said at least one processing unit to further determine said motion state based, at least in part, on at least one SPS signal obtained at said mobile device via said SPS receiver.

16. The apparatus as recited in claim 10, said at least one processing unit to further:
    affect operation of at least one function performed, at least in part, by said mobile device based, at least in part, on said motion state.

17. The apparatus as recited in claim 16, wherein said at least one function performed, at least in part, by said mobile device comprises at least one of a navigation function and/or a power control function.

18. The apparatus as recited in claim 16, wherein said at least one mechanism comprises at least one of a mobile device user and/or a machine.

19. An apparatus for use in classifying a motion state of a mobile device, the apparatus comprising:
    means for filtering sensed data from one or more sensors at a mobile device based, at least in part, on a vibration profile for at least one mechanism capable of inducing movement of at least said mobile device;
    means for determining a variance value corresponding to a change over a period of time for at least a portion of said filtered sensed data; and
    means for classifying a motion state of said mobile device based, at least in part, on a comparison of said variance value with at least one threshold value.

20. The apparatus as recited in claim 19, wherein said variance value represents at least one of: an average variance value of said portion of said filtered sensed data during said period of time, or a maximum variance value of said portion of said filtered sensed data during said period of time.

21. The apparatus as recited in claim 19, wherein said period of time corresponds to said vibration profile.

22. The apparatus as recited in claim 19, further comprising:
    means for selectively obtaining said sensed data in response to an initial motion detection event.

23. The apparatus as recited in claim 19, wherein said motion state comprises either a stationary state or at least one type of non-stationary state.

24. The apparatus as recited in claim 19, wherein said means for classifying said motion state further comprises:
    means for classifying said motion state based, at least in part, on at least one satellite positioning system (SPS) signal obtained at said mobile device.

25. The apparatus as recited in claim 19, further comprising:
    means for affecting operation of at least one function performed, at least in part, by said mobile device based, at least in part, on said motion state.

26. The apparatus as recited in claim 25, wherein said at least one function performed, at least in part, by said mobile device comprises at least one of a navigation function and/or a power control function.

27. The apparatus as recited in claim 25, wherein said at least one mechanism comprises at least one of a mobile device user and/or a machine.

28. An article comprising:
a non-transitory computer readable medium having stored therein computer-implementable instructions executable by one or more processing units of a mobile device to:
obtain sensed data corresponding to one or more sensors at said mobile device;
filter said sensed data based, at least in part, on a vibration profile for at least one mechanism capable of inducing movement of at least said mobile device;
determine a variance value corresponding to a change over a period of time for at least a portion of said filtered sensed data; and
determine a motion state of said mobile device based, at least in part, on a comparison of said variance value with at least one threshold value.

29. The article as recited in claim 28, wherein said variance value represents at least one of: an average variance value of said portion of said filtered sensed data during said period of time, or a maximum variance value of said portion of said filtered sensed data during said period of time.

30. The article as recited in claim 28, wherein said period of time corresponds to said vibration profile.

31. The article as recited in claim 28, wherein said computer-implementable instructions are further executable by said one or more processing units to:
selectively obtain said sensed data in response to an initial motion detection event.

32. The article as recited in claim 28, wherein said motion state comprises either a stationary state or at least one type of non-stationary state.

33. The article as recited in claim 28, wherein said computer-implementable instructions are further executable by said one or more processing units to:
determine said motion state based, at least in part, on at least one satellite positioning system (SPS) signal obtained at said mobile device.

34. The article as recited in claim 28, wherein said computer-implementable instructions are further executable by said one or more processing units to:
affect operation of at least one function performed, at least in part, by said mobile device based, at least in part, on said motion state.

35. The article as recited in claim 34, wherein said at least one function performed, at least in part, by said mobile device comprises at least one of a navigation function and/or a power control function.

36. The article as recited in claim 34, wherein said at least one mechanism comprises at least one of a mobile device user and/or a machine.

* * * * *